US012512287B2

(12) United States Patent
Wyatt et al.

(10) Patent No.: US 12,512,287 B2
(45) Date of Patent: Dec. 30, 2025

(54) SYSTEM AND METHOD FOR SETTING ARC GAPS ON A PLURALITY OF AUXILIARY SWITCHES OF AN ELECTRICAL CONTACTOR

(71) Applicant: SAFRAN POWER USA, LLC, Twinsburg, OH (US)

(72) Inventors: Christopher Kenneth Wyatt, Twinsburg, OH (US); Dean Morgan, Twinsburg, OH (US); Zachary Cerniga, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 229 days.

(21) Appl. No.: 18/248,532

(22) PCT Filed: Oct. 23, 2020

(86) PCT No.: PCT/US2020/057029
§ 371 (c)(1),
(2) Date: Apr. 11, 2023

(87) PCT Pub. No.: WO2022/086553
PCT Pub. Date: Apr. 28, 2022

(65) Prior Publication Data
US 2024/0021391 A1 Jan. 18, 2024

(51) Int. Cl.
*H01H 50/56* (2006.01)
*H01H 50/54* (2006.01)

(52) U.S. Cl.
CPC ........... *H01H 50/541* (2013.01); *H01H 50/56* (2013.01)

(58) Field of Classification Search
CPC ..... H01H 50/541; H01H 50/56; H01H 50/546
(Continued)

(56) References Cited

U.S. PATENT DOCUMENTS 3,740,510 A * 6/1973 Grunert ................ H01H 50/546 218/1
3,806,850 A * 4/1974 McFarlin ............... H01H 50/88 335/203
(Continued)

FOREIGN PATENT DOCUMENTS

EP 3002769 A1 4/2016

OTHER PUBLICATIONS

International Search Report and Written Opinion, International Application No. PCT/US2020/057029, dated Jul. 26, 2021, 11 pages.
(Continued)

*Primary Examiner* — Shawki S Ismail
*Assistant Examiner* — Lisa N Homza
(74) *Attorney, Agent, or Firm* — Kilpatrick Townsend & Stockton LLP

(57) ABSTRACT

An electrical contactor auxiliary switch assembly includes an auxiliary switch actuator that includes an upper portion, a middle portion, and a lower portion. The electrical contactor auxiliary switch assembly also includes a plurality of auxiliary switches that are attached to the middle portion of the auxiliary switch actuator. The electrical contactor auxiliary switch assembly further includes an adjustment nut that is disposed underneath the plurality of auxiliary switches to accept the lower portion of the auxiliary switch actuator and is configured to be accessed and rotated to a predetermined amount during assembly of the electrical contactor to set respective arc gaps on each of the plurality of auxiliary switches.

8 Claims, 6 Drawing Sheets

(58) Field of Classification Search
USPC .......................................................... 335/197
See application file for complete search history.

(56) References Cited

U.S. PATENT DOCUMENTS

| | | | | |
|---|---|---|---|---|
| 3,942,143 | A * | 3/1976 | Pollmann | H01H 50/541 335/132 |
| 5,677,655 | A * | 10/1997 | Hinata | H01H 50/14 335/132 |
| 5,680,084 | A * | 10/1997 | Kishi | H01H 1/66 335/154 |
| 5,992,822 | A * | 11/1999 | Nakao | F16K 31/0655 335/262 |
| 6,218,921 | B1 * | 4/2001 | Eberts | H01H 71/322 335/229 |
| 9,543,102 | B2 * | 1/2017 | Tachikawa | H01H 50/546 |
| 2017/0287652 | A1 * | 10/2017 | Fischer | H01H 50/541 |
| 2018/0144894 | A1 * | 5/2018 | Takaya | H01H 50/14 |
| 2018/0218867 | A1 * | 8/2018 | Wyatt | H01H 71/46 |
| 2018/0315574 | A1 * | 11/2018 | Wyatt | H01H 71/46 |

OTHER PUBLICATIONS

European Application No. 20807603.4, Office Action mailed on Mar. 24, 2025, 6 pages.

* cited by examiner

SYSTEM AND METHOD FOR SETTING ARC GAPS ON A PLURALITY OF AUXILIARY SWITCHES OF AN ELECTRICAL CONTACTOR

CROSS REFERENCE TO RELATED APPLICATION

This application is a U.S. national phase under 35 U.S.C. § 371 of International Patent Application No. PCT/US2020/057029, filed on Oct. 23, 2020, the entire contents of which is incorporated herein by reference in its entirety.

BACKGROUND

Currently setting respective required switch opening gaps (arc gaps) during the assembly of auxiliary switches on electrical contactors may be a complex, time consuming, and inconsistently executed process. In particular, the assembly of auxiliary switches on electrical contactors may require shims and/or contacts to be bent in order to set required arc gaps during the assembly of each respective auxiliary switch. This requirement may be inefficient and operator dependent.

In many instances, the auxiliary switch assemblies may need to be assembled and measurements of the arc gaps may be taken. If the measurements are not determined to be within a desired range, the auxiliary switch assemblies may have to be disassembled and adjusted repeatedly in order to adjust the arc gaps to achieve the desired measurement range.

The assembling, measuring, disassembling, adjusting, and reassembling may result in an inefficient, expensive, and an inconsistent assembly process. For example, there may be inconsistency with respect to measurements of the arc gaps between assembled auxiliary switches by a particular manufacturer that may lead to time consuming and cost prohibitive disassembly and reassembly of numerous electrical contactors.

SUMMARY

In view of the foregoing, an electrical contactor auxiliary switch assembly is disclosed that includes an auxiliary switch actuator that includes an upper portion, a middle portion, and a lower portion. The upper portion is inserted into a return spring to hold the auxiliary switch in place. The electrical contactor auxiliary switch assembly also includes a plurality of auxiliary switches that are attached to the middle portion of the auxiliary switch actuator. The plurality of auxiliary switches are configured to move the position of the auxiliary switch actuator to open or close the electrical contactor. The electrical contactor auxiliary switch assembly also includes an adjustment nut that is disposed underneath the plurality of auxiliary switches to accept the lower portion of the auxiliary switch actuator and is configured to be accessed and rotated to a predetermined amount during assembly of the electrical contactor to set respective arc gaps on each of the plurality of auxiliary switches.

According to another aspect, an electrical contactor is disclosed that includes an auxiliary switch actuator that is attached to a return spring. The electrical contactor also includes an adjustment nut that is configured to accept a portion of the auxiliary switch actuator. The auxiliary switch actuator is held against the adjustment nut by the return spring. The adjustment nut is rotatable during assembly of auxiliary switch to set auxiliary switch opening gaps to desired measurements.

According to yet another aspect, a method for setting arc gaps on a plurality of multiple auxiliary switches of an electrical contactor is disclosed that includes inserting an upper portion of an auxiliary switch actuator of the electrical contactor within a return spring to hold the auxiliary switch actuator in place upon an adjustment nut of the electrical contactor.

The method also includes attaching a plurality of auxiliary switches to attachment points of a middle portion of the auxiliary switch actuator to allow a position of the auxiliary switch actuator to be modified to open or close the electrical contactor during operation of the electrical contactor. The method further includes rotating the adjustment nut to a predetermined amount during assembly of the electrical contactor to set respective arc gaps on the plurality of auxiliary switches, wherein the respective arc gaps are set to prevent arcing from occurring during opening and closing of the electrical contactor during the operation of the electrical contactor.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
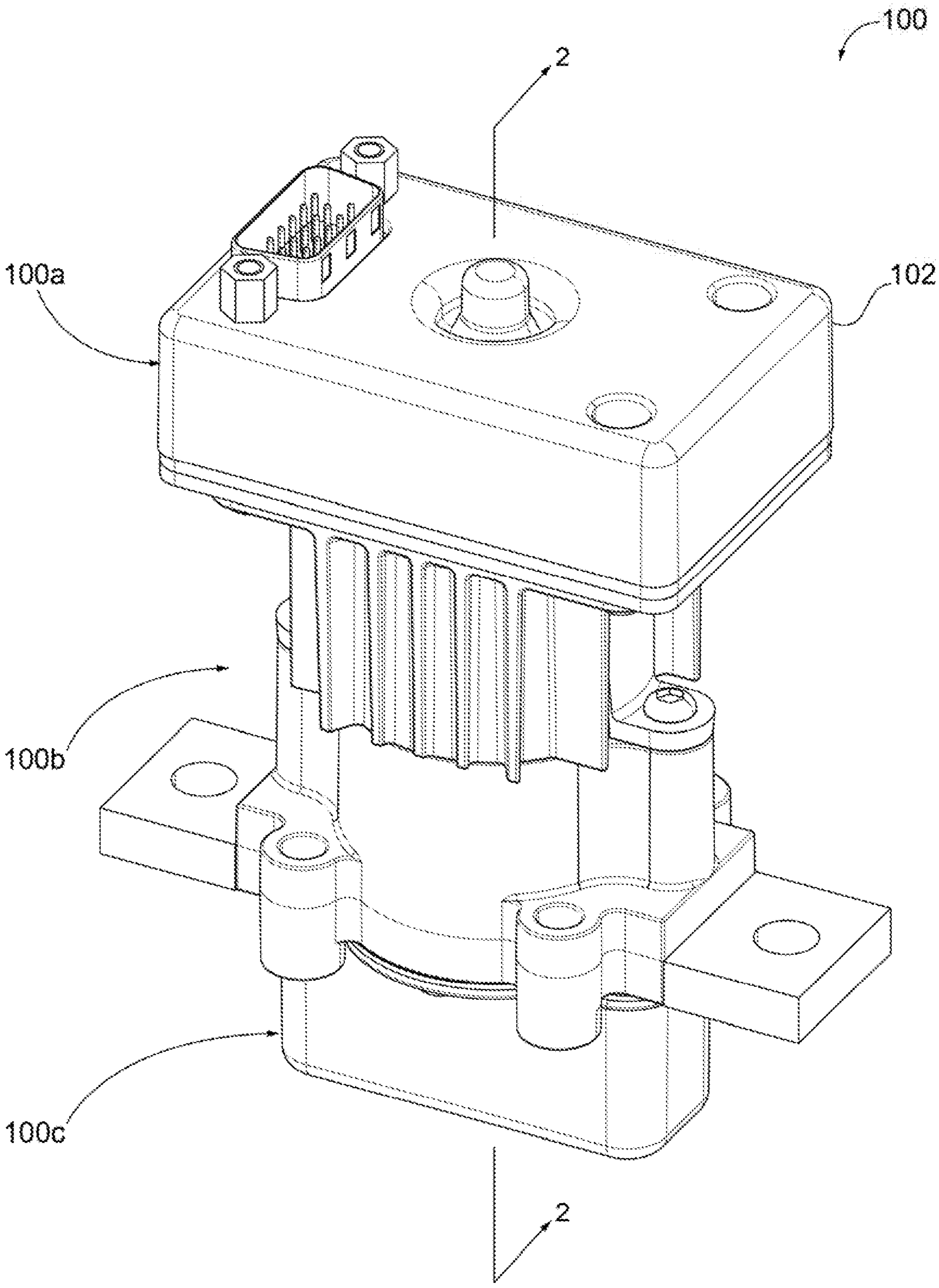
FIG. 1 is a perspective view of an electrical contactor according to an exemplary embodiment of the present disclosure.

FIG. 1 is a perspective view of an electrical contactor (contactor) 100. As shown in FIG. 1, the contactor 100 may include an upper portion 100*a*, a middle portion 100*b*, and a lower portion 100*c*. The upper portion 100*a* may include an auxiliary switch assembly 102. The middle portion 100*b* may include a solenoid plunger of the contactor 100 and the lower portion 100*c* may include a plunger base of the contactor 100. This disclosure will provide details that pertain to a functionality of the auxiliary switch assembly 102 with respect to a solution for setting switch opening gaps during an initial assembly of the contactor 100. It is to be appreciated that the present disclosure and the functionality of the solution for setting switch opening gaps may additionally or alternatively be applied during an initial assembly of an electrical relay (not shown).

Figure 2:
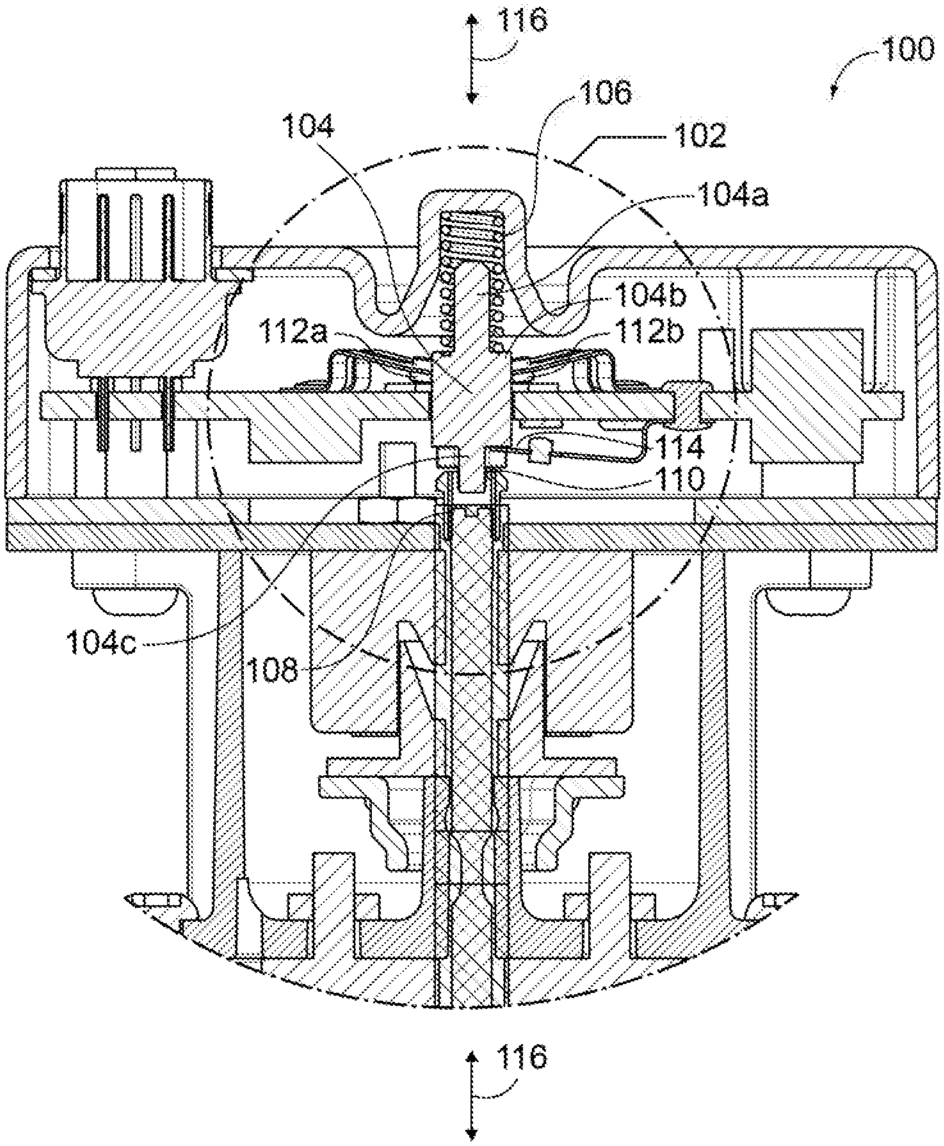
FIG. 2 is a cross-sectional elevation view of an electrical contactor and specifically an auxiliary switch assembly of the electrical contactor according to an exemplary embodiment of the present disclosure.

As shown in FIG. 1, a cross-section line '2' is included to provide reference as to where a cross-section of FIG. 2 is taken. As shown in FIG. 2, the auxiliary switch assembly 102 includes an auxiliary switch actuator (auxiliary actuator) 104. The auxiliary actuator 104 may be configured as an adjustable actuator. As shown in FIG. 4, the auxiliary actuator 104 may be movable along a longitudinal axis 116 such that the auxiliary actuator 104 may be lowered towards a solenoid plunger 108 of the contactor 100 to close the contactor 100 and put the contactor 100 in an ON position to complete an electrical circuit based on an actuation and operation of a plurality of auxiliary switches 112*a*, 112*b*, 114. Additionally, as shown in FIG. 3, the auxiliary actuator 104 may be movable along the longitudinal axis 116 such that the auxiliary actuator 104 may be raised away from the solenoid plunger 108 of the contactor 100 to open the contactor 100 and put the contactor in an OFF position to break the electric circuit based on the actuation and operation of a plurality of auxiliary switches 112*a*, 112*b*, 114.

Figure 3:
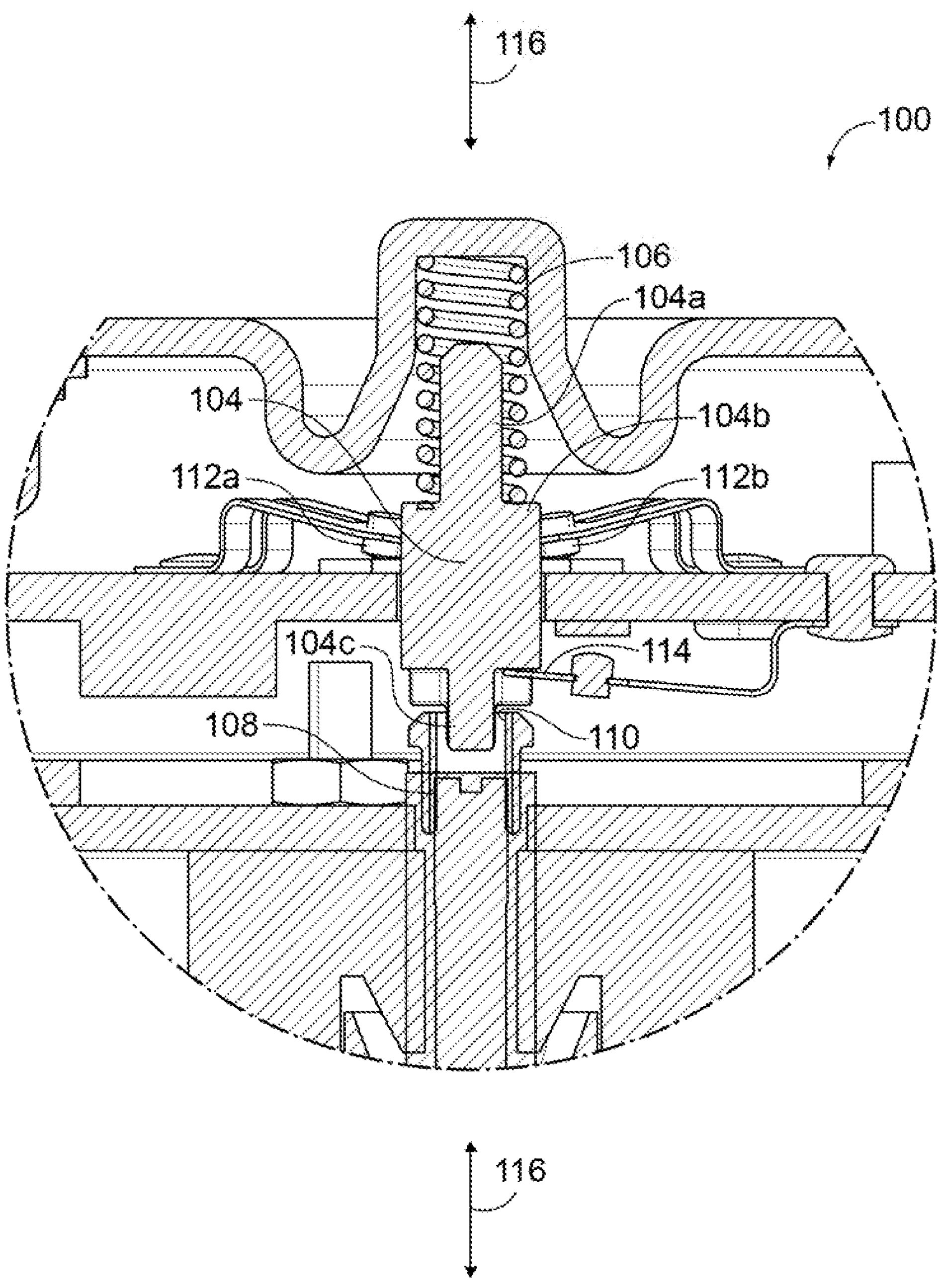
FIG. 3 is a close-up view of the auxiliary switch assembly of the electrical contactor according to an exemplary embodiment of the present disclosure.
Figure 4:
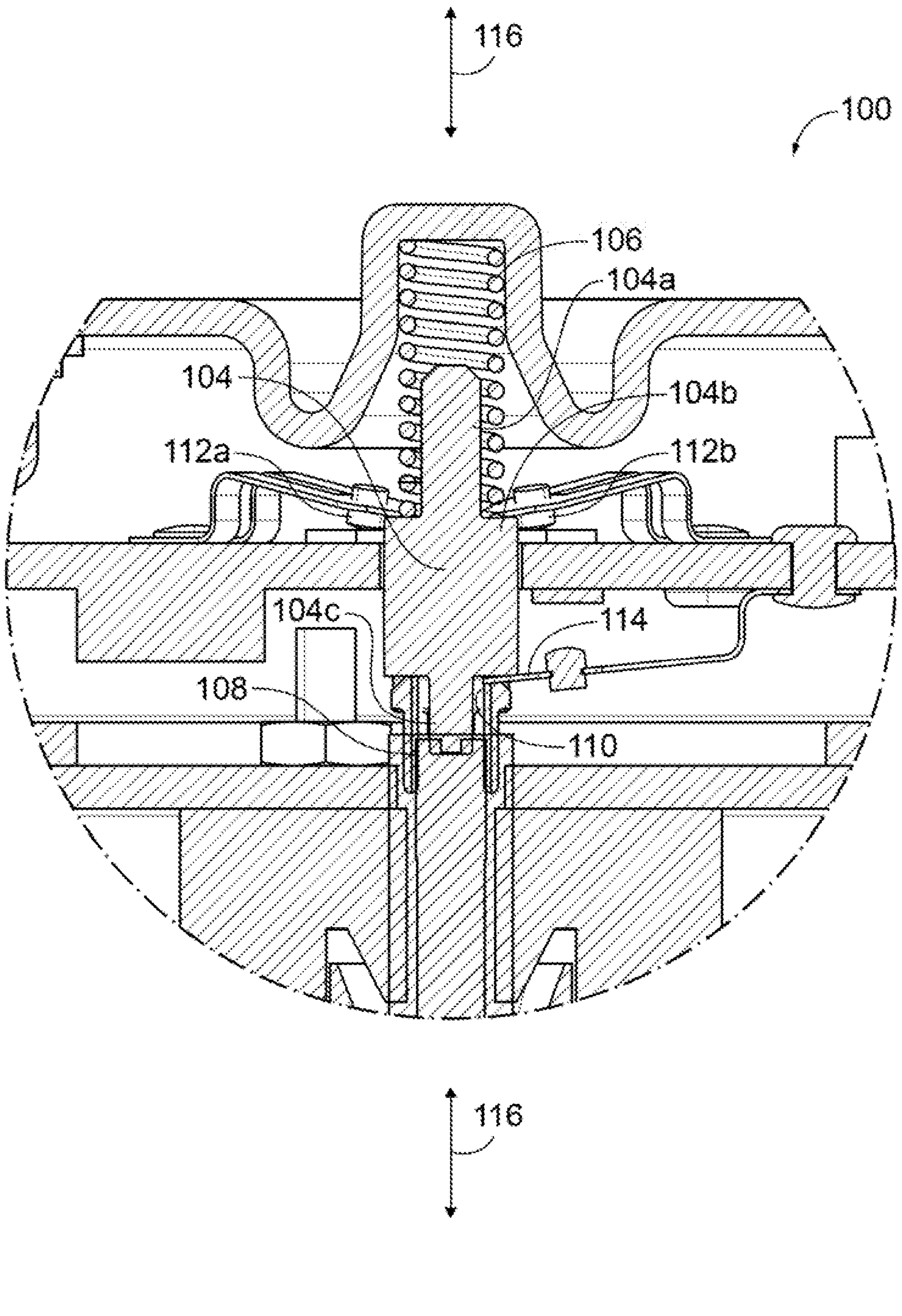
FIG. 4 is a cross-sectional elevation view of the electrical contactor in an ON position according to an exemplary embodiment of the present disclosure.

With continued reference to FIGS. 2-4, the auxiliary switch assembly 102 is configured to ensure that during opening and/or closing of the contactor 100 electrical arcs are disallowed from occurring between contact points of the contactor 100 as electrical current may travel across respective switch opening gaps (arc gaps) that are associated with each of the plurality of auxiliary switches 112*a*, 112*b*, 114. Accordingly, this disclosure is directed to setting arc gaps at respective desired measurements during an initial assembly stage of the contactor 100 to prohibit arcing from occurring during operation of the contactor 100 (e.g., during a use case of the contactor 100).

Figure 5:
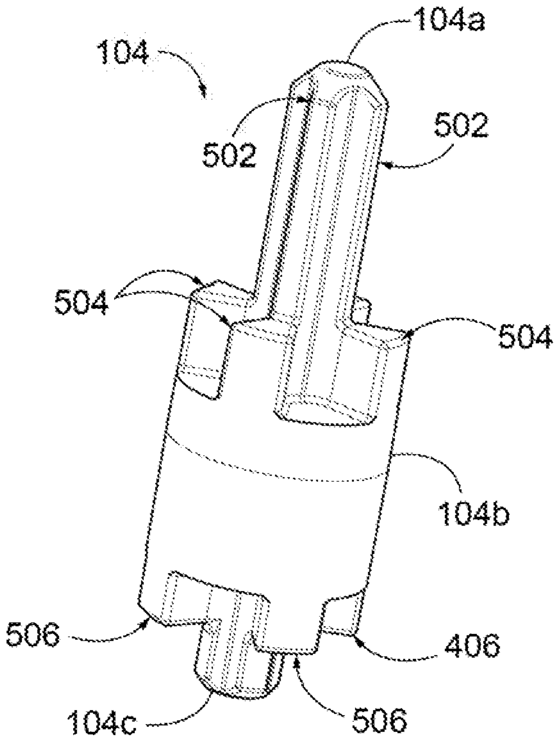
FIG. 5 is a perspective view of an auxiliary switch actuator according to an exemplary embodiment of the present disclosure.

In an exemplary embodiment, the auxiliary actuator 104 may include an upper portion 104*a*, a middle portion 104*b*, and a lower portion 104*c*. As shown in FIG. 5 and with continued reference to FIGS. 2-4, the upper portion 104*a* of the auxiliary actuator 104 may be configured as a slotted cylindrical portion that includes a plurality of slotted sections 502 that are disposed on two or more sides of the upper portion 104*a*. The plurality of slotted sections 502 of the upper portion 104*a* may be configured to be inserted within a return spring 106 of the auxiliary switch assembly 102. Accordingly, the return spring 106 may thereby hold the auxiliary actuator 104 in place. This configuration also allows the auxiliary actuator 104 to provide a post for holding the return spring 106 in place.

In one embodiment, the middle portion 104*b* of the auxiliary actuator 104 may be configured as a cylindrical portion and may be configured to have a larger diameter than the upper portion 104*a*. The middle portion 104*b* may be configured to include upper attachment points 504 and lower attachment points 506. The upper attachment points 504 and lower attachment points 506 may be utilized to attach to respective auxiliary switches of the plurality of auxiliary switches 112*a*, 112*b*, 114 of the auxiliary switch assembly 102. In one configuration, the lower portion 104*c* of the auxiliary actuator 104 may also be configured as a cylindrical portion. In one configuration, the lower portion 104*c* may be configured to have a smaller diameter than the upper portion 104*a* and the middle portion 104*b*. In an exemplary embodiment, the diameter of the lower portion 104*c* may be configured to be inserted within an adjustment nut 110.

Figure 6:
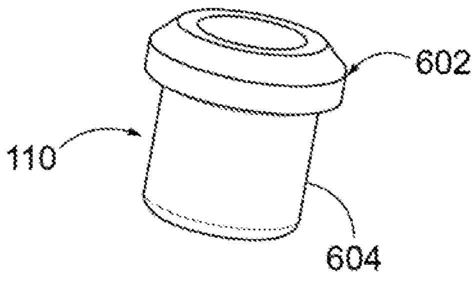
FIG. 6 is a perspective view of an adjustment nut according to an exemplary embodiment of the present disclosure.

With particular reference to FIG. 6, the adjustment nut 110 may be configured as a circular hollow nut that may be shaped and sized to accept the lower portion 104*c* of the auxiliary actuator 104. As shown, the adjustment nut 110 may include a cylindrical head portion 602. In one configuration, the cylindrical head portion 602 of the adjustment nut 110 may be configured as a tapered head that is configured to allow the auxiliary actuator 104 to sit atop the adjustment nut 110 when the contactor 100 is open and in the OFF position. The adjustment nut 110 may include a cylindrical body portion 604 that may be configured to accept the lower portion 104*c* of the auxiliary actuator 104 as the auxiliary actuator 104 is lowered down along the longitudinal axis 116 towards the solenoid plunger 108 of the contactor 100 to close the contactor 100 to complete an electrical circuit during the ON position of the contactor 100.

With reference to FIGS. 2-4, in one embodiment, the plurality of auxiliary switches 112 may include upper auxiliary switches 112*a*, 112*b* and a lower auxiliary switch 114. In an alternate embodiment, the plurality of auxiliary switches 112 may include another lower auxiliary switch (not shown) that may be disposed opposite (e.g., on an opposite end of the middle portion 104*b* of the auxiliary actuator 104) the lower auxiliary switch 114. In one configuration, the upper auxiliary switches 112*a*, 112*b* may be attached to the middle portion 104*b* of the auxiliary actuator 104.

In particular, the upper auxiliary switches 112*a*, 112*b* may each respectively be associated with the upper attachment points 404 of the middle portion 104*b* of the auxiliary actuator 104. In one embodiment, the upper auxiliary switches 112*a*, 112*b* may be connected to respective movable contact arm assemblies that may be used to indicate the position of the auxiliary actuator 104. Accordingly, as illustrated in FIG. 4, based on the functionality of the respective movable contact arm assemblies, the upper auxiliary switches 112*a*, 112*b* may be configured to manipulate the position of the auxiliary actuator 104 to move in a downward direction along the longitudinal axis 116 to close the contactor 100 to complete an electrical circuit.

In one or more embodiments, the lower auxiliary switch 114 may be attached to the middle portion 104*b* of the auxiliary actuator 104. In particular, the lower auxiliary switch 114 may be associated with the lower attachment point 406 of the middle portion 104*b* of the auxiliary actuator 104. In one embodiment, the lower auxiliary switch 114 may be connected to a movable contact arm assembly that may be used to indicate the position of the auxiliary actuator 104. Accordingly, based on the functionality of the respective movable contact arm assembly, the lower auxiliary switch 114 may be configured to manipulate the position of the auxiliary actuator 104 to move in a downward direction along the longitudinal axis 116 to close the contactor 100 to complete an electrical circuit.

The auxiliary actuator 104 may be configured to be lowered down along the longitudinal axis 116 and the lower portion 104*c* of the longitudinal axis 116 may be inserted into the adjustment nut 110 (as represented in FIG. 4). Accordingly, as discussed, the lower portion 104*c* of the auxiliary actuator 104 may be placed within the adjustment nut 110 as the return spring 106 holds the auxiliary actuator 104 against the adjustment nut 110.

Additionally, the upper auxiliary switches 112*a*, 112*b* and/or the lower auxiliary switch 114 may be configured to allow the auxiliary actuator 104 to move in an upward direction along the longitudinal axis 116 to open the contactor 100 and break the electrical circuit (as represented in FIG. 2 and FIG. 3). As discussed above, the return spring 106 may be configured to hold the auxiliary actuator 104 in place based on the insertion of the plurality of slotted sections 502 of the upper portion 104*a* within the return spring 106. Accordingly, the auxiliary actuator 104 may be held against the adjustment nut 110 by the return spring 106 when the contactor 100 is open.

With continued reference to FIGS. 2-6, in an exemplary embodiment, the adjustment nut 110 may be configured to be accessed and rotated to a predetermined amount during assembly of the contactor 100 to set respective arc gaps that are associated to the upper auxiliary switches 112*a*, 112*b* and the lower auxiliary switch 114. As discussed above, the arc gaps may be set to desired gap measurements that may be utilized to prevent arcing from occurring. In particular, during utilization of the contactor 100, an electrical current may travel across the arc gaps on the pair of auxiliary switches 112*a*, 112*b* and the lower auxiliary switch 114 to allow electrical current to flow. Accordingly, when the respective arc gaps are set to respective desired measurements, arcing may be prevented during opening and/or closing of the contactor 100 due to the arc gaps being configured within the desired gap measurements based on the rotation of the adjustment nut 110.

In one or more embodiments, rotating of the adjustment nut 110 enables the arc gaps to be set to the desired measurement during an initial assembly stage of the contactor 100. In particular, as the return spring 106 is configured to hold the auxiliary actuator 104 in place against the adjustment nut 110, the adjustment nut 110 is configured to be accessed and rotated during the initial assembly stage to adjust the arc gaps as needed to set the arc gaps to the desired measurement without any further post assembly manipulation of the arc gaps.

The aforementioned configuration accordingly includes components that allow the arc gaps to be measured and adjusted to be set without the use of shims and/or without the bending of contacts. Accordingly, the configuration of the auxiliary actuator 104 and the adjustment nut 110 may allow for the arc gaps associated with each of the pair of auxiliary switches 112*a*, 112*b* and/or the lower auxiliary switch 114 to be set to respective desired measurements without the need of inefficient, expensive, and difficult assembly, measurement, disassembly, and reassembly of the contactor 100 that may be otherwise required.

The design of the auxiliary actuator 104 in combination with the return spring 106 and the adjustment nut 110 allows an ease of adjustability with respect to a precise setting of the arc gaps. This design may further allow the contactor 100 to be configured within an acceptable arc gap measurement window that may be consistent with the arc gap measurements of additional contactors that are assembled by a particular manufacturer.

Figure 7:
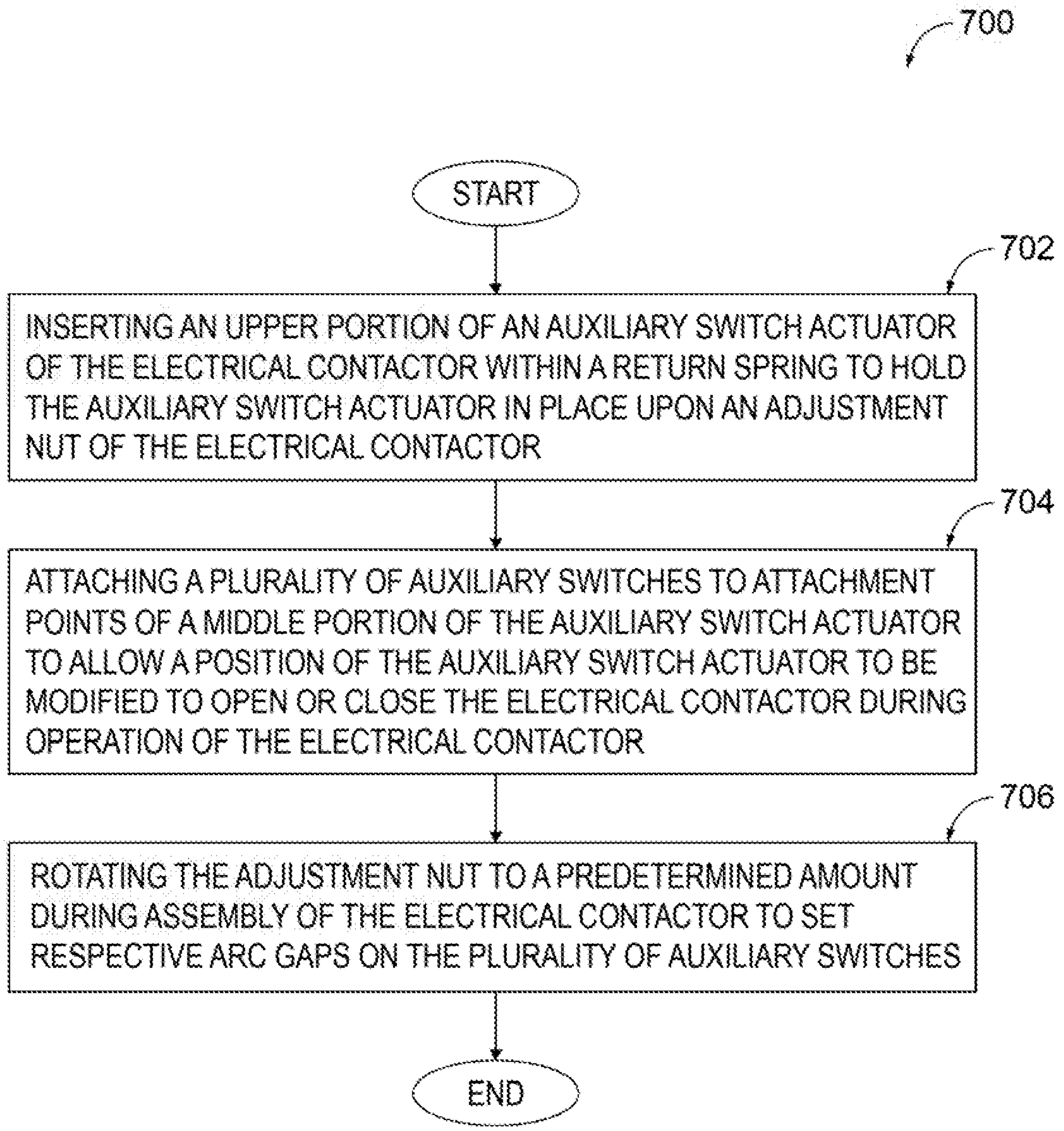
FIG. 7 is a process flow diagram of a method for setting arc gaps on a plurality of auxiliary switches of an electrical contactor according to an exemplary embodiment of the present disclosure.

FIG. 7 is a process flow diagram of a method 700 for setting arc gaps on a plurality of auxiliary switches 112*a*, 112*b*, 114 of an electrical contactor 100 according to an exemplary embodiment of the present disclosure. FIG. 7 will be described with reference to the components of FIG. 1 through FIG. 6 though it is to be appreciated that the method 700 of FIG. 7 may be used with other components. The method 700 may begin at block 702, wherein the method 700 may include inserting an upper portion 104*a* of an auxiliary actuator 104 of the electrical contactor 100 within a return spring 1060 to hold the auxiliary actuator 104 in place upon an adjustment nut 110 of the electrical contactor 100.

The method 700 may proceed to block 704, wherein the method 700 may include attaching a plurality of auxiliary switches 112*a*, 112*b*, 114 to attachment points 404, 406 of a middle portion 104*b* of the auxiliary actuator 104 to allow a position of the auxiliary actuator 104 to be modified to open or close the electrical contactor 100 during operation of the electrical contactor 100.

The method 700 may proceed to block 706, wherein the method 700 may include rotating the adjustment nut 110 to a predetermined amount during assembly of the electrical contactor 100 to set respective arc gaps on the plurality of auxiliary switches 112*a*, 112*b*, 114. In one embodiment, the respective arc gaps are set to prevent arcing from occurring during opening and closing of the electrical contactor during the operation of the electrical contactor.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electrical contactor auxiliary switch assembly, comprising:

- an auxiliary switch actuator that includes an upper portion, a middle portion, and a lower portion, wherein the upper portion is inserted into a return spring to hold the auxiliary switch in place, wherein the upper portion includes a plurality of slotted sections that is disposed on at least two sides of the upper portion;
- a plurality of auxiliary switches that are attached to the middle portion of the auxiliary switch actuator, wherein the plurality of auxiliary switches are configured to move a position of the auxiliary switch actuator to open or close the electrical contactor; and
- an adjustment nut that is disposed underneath the plurality of auxiliary switches and is configured to accept the lower portion of the auxiliary switch actuator, wherein the adjustment nut is configured to be accessed and rotated a predetermined amount during assembly of the electrical contactor to set respective arc gaps on each of the plurality of auxiliary switches.

2. The electrical contactor auxiliary switch assembly of claim 1, wherein the upper portion of the auxiliary switch actuator is configured as a slotted cylindrical portion.

3. The electrical contactor auxiliary switch assembly of claim 1, wherein the plurality of slotted sections are configured to be inserted within the return spring to allow the return spring to hold the auxiliary actuator in place.

4. The electrical contactor auxiliary switch assembly of claim 1, wherein the middle portion of the auxiliary switch actuator includes upper attachment points that are configured to be attached to upper auxiliary switches of the electrical contactor.

5. The electrical contactor auxiliary switch assembly of claim 1, wherein the middle portion of the auxiliary switch actuator includes a lower attachment point that is configured to be attached to a lower auxiliary switch of the electrical contactor.

6. The electrical contactor auxiliary switch assembly of claim 1, wherein the lower portion of the auxiliary switch actuator is configured to have a smaller diameter than the upper portion and the middle portion, wherein the lower portion is configured to be inserted within the adjustment nut as the electrical contactor is closed.

7. The electrical contactor auxiliary switch assembly of claim 1, wherein the adjustment nut is configured as a circular hollow nut that is shaped and sized to accept the lower portion of the auxiliary actuator.

8. The electrical contactor auxiliary switch assembly of claim 1, wherein the adjustment nut is configured to be rotated to enable the respective arc gaps to be set to a desired measurement during an initial assembly stage of the electrical contactor.

* * * * *